Feb. 14, 1933.    C. W. FREDERICK ET AL    1,897,896
OBJECTIVE
Filed May 13, 1931
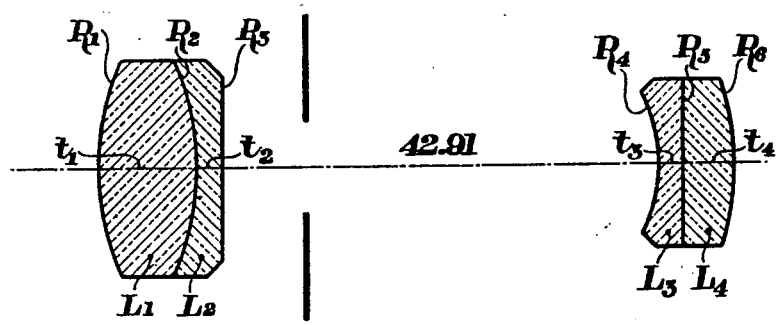
$F/4.5$: Focal length = 100.
| Lens. | Glass. | Radii | Thickness. |
|---|---|---|---|
| $L_1$ | $D=1.51625$ $G=1.52841$ $V=64.05$ | $R_1=29.07$ $R_2=33.46$ | $t_1=6.19$ |
| $L_2$ | $D=1.61644$ $G=1.63873$ $V=36.6$ | $R_3=\infty$ | $t_2=1.96$ |
| $L_3$ | $D=1.61016$ $G=1.62396$ $V=36.5$ | $R_4=15.42$ $R_5=\infty$ | $t_3=1.96$ |
| $L_4$ | $D=1.60501$ $G=1.62396$ $V=36.0$ | $R_6=27.49$ | $t_4=2.93$ |
Charles W. Frederick
William S. Eichelberger,
Inventors
By Newton M. Perrins
Rolla N. Carter
Attorneys Patented Feb. 14, 1933

1,897,896

UNITED STATES PATENT OFFICE

CHARLES W. FREDERICK AND WILLIAM S. EICHELBERGER, OF ROCHESTER, NEW YORK, ASSIGNORS TO EASTMAN KODAK COMPANY, OF ROCHESTER, NEW YORK, A CORPORATION OF NEW YORK

OBJECTIVE

Application filed May 13, 1931. Serial No. 537,016.

This invention relates to optical systems usually known under the name of telephoto objectives, and particularly to such objectives for use in moving picture photography where only a small angular field is required. It is an object of this invention to provide a new and simplified objective of this type which will secure good definition over the small angular field required using a large relative aperture, will yield unusually good correction for all aberrations over this restricted area and at the same time will be economical and easy to manufacture.

Broadly this invention comprises a compound collective element in front separated by an air space from a compound dispersive element in the rear nearest the film or image. Because the area of good definition that is required is relatively small, it is possible to so modify the construction and choose the materials of the objective as to yield unusually good correction for all aberrations over this restricted area, and at the same time to arrive at a physical structure that will be easy to manufacture.

In carrying out the objects of this invention we have made use of a glass in the double convex front lens of the front compound element that is unusually low in index for objectives of this type. To this double convex lens we cement a plano-concave lens of dense flint to complete the front element of the objective. An index of less than 1.53 for the glass of the front element is conducive to good spherical aberration in the objective as a whole and also to flatness of field, and the plano-concave lens is favorable to easy manufacture.

In the rear element a meniscus form is made up of two lenses cemented together. The cemented surfaces most favorable to manufacture are planes or surfaces of weak curvature. In selecting the glass for the two lenses of the rear element, we have chosen those in which the index is substantially the same. This enables us to change the cemented surfaces from plane to weak curves either way to modify or adjust the color correction of the objective as a whole without influencing the other corrections, since the power of the cemented surfaces is substantially zero.

In designing this objective the following relations were adopted: The focal length of the front compound collective element is numerically the same as the focal length of the back compound dispersive element and the distance between these elements measured from the rear Gauss point of the front element to the front Gauss point of the back element is substantially two-thirds of the focal length of the front element. The focal length of this element is in turn two-thirds of the focal length of the entire objective. In the made up lens the air space separating the elements measured from glass surface to glass surface is less than four-ninths and more than one-third of the focal length of the objective, and the back focus measured from glass to focal plane is substantially one-fourth of the focal length of the objective, differing from this fraction by not more than 5% of the equivalent focus of the objective due to manufacturing errors or necessary adjustments.

In the theory of this lens it was found difficult to satisfy the sine condition and eliminate coma with a plane surface in the front element. But with a large difference in index between the two glasses of this element and therefore a strong dispersive power at the cemented surface, it was possible to accomplish this end.

By arbitrarily choosing the numerical values of the focal lengths of the front collective element and back dispersing element substantially equal, say within three or four per cent, we insure a condition that will approximately satisfy the Petzval sum and thus produce a flat field with small astigmatism in the final objective. The final lens was as follows: The sum of the positive items of $\mu - 1/R\mu$ for a lens of 100 mm. equivalent focus was $+0.036147$ and the sum of the negative items was $-0.036566$, a very good agreement. The final lens as made up showed a reasonably flat field and freedom from astigmatism. The size of a distant point source of light made with this lens showed scarcely any difference in appearance at the extreme corners of the picture as compared with that in the center when examined with a high power microscope.

The following are specifications for an "f.4.5" telephoto lens of 100 mm. focal length and 25.223 mm. back focus made in accordance with the claims of this invention:

| Lens | Glass | Radii | Thicknesses |
|---|---|---|---|
| L₁ | D = 1.51625<br>G' = 1.52641<br>v = 64.05 | R₁ = 29.07<br>R₂ = 33.46 | t₁ = 6.19 |
| L₂ | D = 1.61644<br>G' = 1.63873<br>v = 36.6 | R₃ = ∞ | t₂ = 1.96 |
| L₃ | D = 1.61016<br>G' = 1.62396<br>v = 56.5 | R₄ = 15.42<br>R₅ = ∞ | t₃ = 1.96 |
| L₄ | D = 1.60301<br>G' = 1.62396<br>v = 38.0 | R₆ = 27.49 | t₄ = 2.93 |

Axial separation = 42.91 mm.
Focal length of Front component = 66.7 mm. Focal length of Rear component = 66.6 mm.

It is to be understood that the above specified objective is an example and that we contemplate as within the scope of our invention such modifications and equivalents as fall within the scope of the appended claims.

Having thus described our invention, what we claim as new and desire to secure by Letters Patent of the United States is:

1. A telephoto objective for cine photography having a large relative aperture and narrow field corrected for spherical aberration, coma, chromatic aberration, astigmatism and curvature of field consisting of a collective element and a dispersive element of numerically equal focal lengths and substantially two-thirds the focal length of the whole objective and separated by an air space less than 4/9 and more than 1/3 of the focal length of the objective, and having a back focus substantially one-fourth of the focal length of the objective, the first element consisting of a double convex simple lens of index 1.516 for the D-line plus or minus 0.010 cemented to a plano-concave simple lens of index 1.617 for the D-line plus or minus 0.010, and a rear element consisting of a plano-concave simple lens of crown glass with the concave surface toward the air space and the plane surface cemented to a plano-convex simple lens of flint glass, the indices of the glasses being substantially the same for the two elements.

2. A telephotographic objective of relative large aperture and narrow field, free from astigmatism, coma, spherical and chromatic aberrations, and curvature of the field, comprising two achromatized cemented doublets having substantially equal focal lengths, the front doublet being collective and the rear doublet being dispersive.

3. A telephotographic objective comprising two air spaced cemented doublets, the front doublet consisting of a bi-convex lens cemented to a plano-concave lens and the back doublet consisting of a plano-concave lens cemented to a plano-convex lens made of glass of refractive index not greater than .01 less than that of the plano-concave lens.

4. A telephotographic objective comprising two air spaced cemented doublets of which the front one is positive and the back one is negative, the negative and the positive being spaced by a distance less than 4/9 and more than 1/3 of the focal length of the objective, and characterized by the following features: the focal length of the positive does not differ by more than 4% from the focal length of the negative and is substantially equal to 2/3 of the focal length of the objective; the back focus measured from glass to focal plane is more than 20% and less than 30% of the focal length of the objective.

5. In a telephotographic objective corrected for spherical aberration, coma, astigmatism, curvature and chromatic abberations having a large relative aperture and small angular field, the combination with a front component comprising a biconvex first lens of glass having a refractive index for the D-line of the spectrum of not more than 1.53 cemented to a negative second lens of glass of refractive index greater by at least 0.08 than that of the glass of the first lens, and a back component spaced behind said front component by a distance less than 4/9 and more than 1/3 of the focal length of the objective.

Signed at Rochester, New York, this 7th day of May, 1931.

CHARLES W. FREDERICK.
WILLIAM S. EICHELBERGER.